United States Patent

Singer

[15] 3,665,019
[45] May 23, 1972

[54] ANTHRAQUINONE DYESTUFFS

[72] Inventor: Josef Singer, Leverkusen, Germany

[73] Assignee: Farbenfabriken Bayer Aktiengesellschaft, Leverkusen, Germany

[22] Filed: Feb. 24, 1970

[21] Appl. No.: 14,724

Related U.S. Application Data

[63] Continuation of Ser. No. 607,885, Jan. 9, 1967, abandoned.

[30] Foreign Application Priority Data

Jan. 18, 1966 Germany ..............................F 48195
Nov. 25, 1966 Germany ..............................F 50764

[52] U.S. Cl..................................................260/374, 8/39
[51] Int. Cl. .......................................................C09b 1/34
[58] Field of Search..................................................260/374

[56] References Cited

UNITED STATES PATENTS 3,320,287  5/1967  Schwander ..........................260/372

*Primary Examiner*—Lorraine A. Weinberger
*Assistant Examiner* – E. Jane Skelly
*Attorney*—Plumley & Tyner

[57] ABSTRACT

Anthraquinone dyestuffs suitable for dyeing natural and synthetic polypeptide fibers, such as silk and polyamide fibers, are provided of the formula:

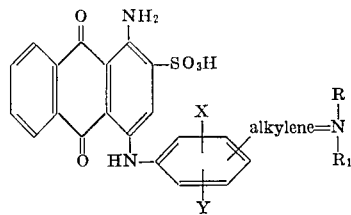

wherein X and Y are hydrogen, halogen, methyl, ethyl, methoxy, or ethoxy; R is hydrogen, methyl or ethyl; and $R_1$ is phenylsulfonyl or substituted phenylsulfonyl.

4 Claims, No Drawings

ANTHRAQUINONE DYESTUFFS

This is a continuation of co-pending application Ser. No. 607,885, filed Jan. 9, 1967, and now abandoned.

This invention comprises new and valuable acid dyestuffs of the anthraquinone series, and the production and use of the same.

The new dyestuffs are obtained, according to the invention, when a compound of the formula

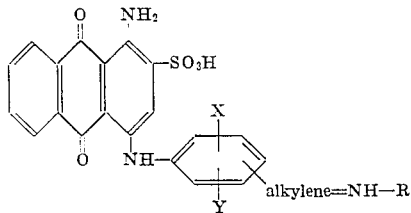

wherein X and Y, which may be the same or different, stand for hydrogen, halogen, or a methyl, ethyl, methoxy or ethoxy group; alkylene stands for methylene or ethylene; and R stands for hydrogen, methyl or ethyl, is acylated with a sulphonic acid of the benzene series; or when 4-bromo-1-aminoanthraquinone-2-sulphonic acid is reacted with an amine of the formula

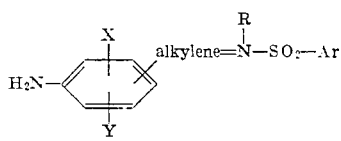

wherein R, X, Y and alkylene have the meaning stated above and Ar stands for an unsubstituted or substituted benzene radical. As acylating agent, chiefly the chloride of the sulphonic acid is suitable. Besides benzenesulphonic acid chloride itself, its derivatives which are halogenated on the nucleus and its alkylated derivatives may also be used; the latter may themselves also be halogenated in the alkyl group. As examples, the chlorides of 3- and 4-chlorobenzenesulphonic acid, of 3,4-dichlorobenzenesulphonic acid, of 4-methylbenzenesulphonic acid, of 3-chloro-4-methyl-benzenesulphonic acid, of 4-chloromethyl- and of 4-β-chloro-ethylbenzenesulphonic acid are mentioned.

The acylation can be carried out in aqueous medium in the presence of acid-binding agents, such as alkali metal hydroxide and alkali metal carbonate, expediently at temperatures between 40° and 100° C.

The preparation of the arylaminoanthraquinones used as starting material for the process according to the invention can take place in the customary manner, e.g. by reacting 1-amino-4-bromo-anthraquinone-2-sulphonic acid with an amine of the formula

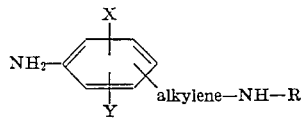

the members of which have the meaning stated above.

As examples of such amines, the following are mentioned:
2-, 3-, or 4-aminobenzyl-N-methylamine,
2-chloro- or 2-methyl-5-aminobenzyl-N-methylamine,
2- or 4-methoxy- or 2-ethoxy-5-aminobenzyl-N-methylamine,
4-methyl-2-methoxy-5-aminobenzyl-N-methylamine,
3-methyl-4-aminobenzyl-N-methylamine,
2,5-dimethyl-4-aminobenzyl-N-methylamine,
2,5-dimethoxy-4-aminobenzyl-N-methylamine,
4-aminobenzyl-N-ethylamine,
α-(3-aminophenyl)-ethyl-N-methylamine.

When the dyestuffs are prepared by reacting 4-bromo-1-amino-anthraquinone-2-sulphonic acid with an acylated aminoaralkylamine, the following are examples of acylated amines which may be used:

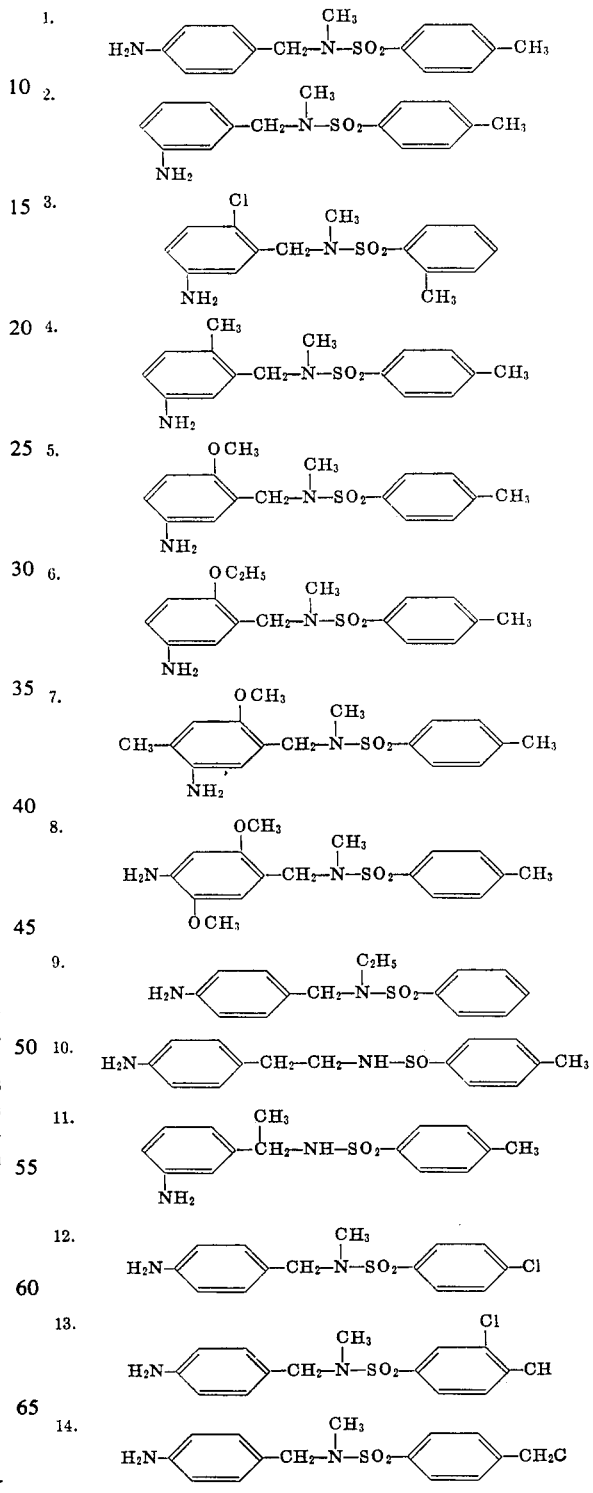

For their preparation, the corresponding nitroaralkylamines are acylated with arylsulphonic acids and the nitro group is then reduced.

The reaction of the aminoaralkylsulphonamides with the bromoamino acid may be carried out at temperatures of 40° to 100° C. in an aqueous medium with the addition of a copper salt and an acid-binding agent, such as sodium carbonate or sodium bicarbonate and, expediently, in an indifferent organic solvent such as ethanol.

The new dyestuffs which are obtainable according to the invention are of the general formula

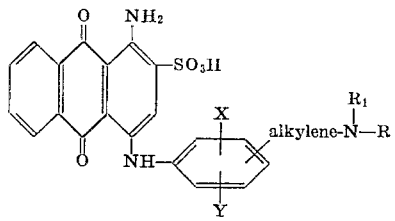

wherein X, Y, alkylene and R have the same meanings as aforesaid and $R_1$ stands for a benzene sulphonyl radical.

Particular dyestuffs according to this formula are hereinafter described and certain preferred ones are hereinafter specifically claimed.

The new dyestuffs, when dyed on wool, give blue shades of high brilliance. In addition, they are of an exceptionally high standard with regard both to the dyeing application and to the usefulness of the dyeings. The high solubility in hot water allows their use in machine dyeing; the neutral affinity and the behavior in the heavy fulling machine are as a rule good to very good, as are the light-fastness and fastness to washing. In the same manner as for wool, the dyestuffs are also suitable for the dyeing of other natural and synthetic polypeptide fibers such as silk and polyamide fibers.

EXAMPLE 1 a. 6 g of the compound of the formula

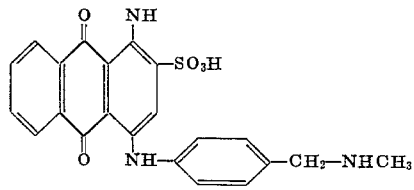

(obtained from 1-amino-4-bromoanthraquinone-2-sulphonic acid and 4-aminobenzyl-N-methylamine) are dissolved in 150 ml water and 1.4g sodium hydroxide and mixed by stirring at 70° C with 2.9g p-toluene-sulphochloride. After acylation has ended, the formed dyestuff of the formula

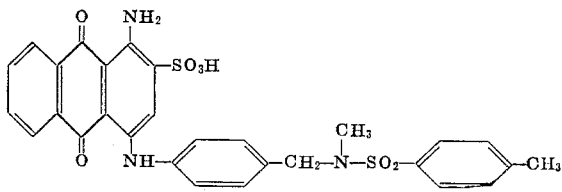

is salted out with sodium chloride, filtered off with suction and dried. It dissolves in water to give a blue color and possesses in boiling water a solubility of more than 90g/liter.

b. The dyeings obtained in brilliant blue shades on wool or synthetic polypeptide fibers from a weakly acid or neutral bath are very fast to light, washing and fulling. Dyeing may take place e.g. as follows: 100g wool yarn are dyed in the customary manner, in a liquor ration 1:50 in the presence of 15 percent sodium sulphate (cryst.) and 5 percent acetic acid, with 1g of the dyestuff obtained according to Example 1 a.

c. A dyestuff with properties similar to the dyestuff prepared according to Example 1 a is obtained when the p-toluenesulpho-chloride is replaced by equivalent amounts of o-toluenesulpho-chloride, 4-chlorobenzensulphochloride, 3-chloro-4-methylbenzenesulphochloride or 4-chloromethylbenzenesulphochloride.

d. When the compound

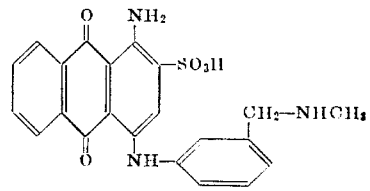

is used in Example 1 a a blue dyestuff is obtained the solubility of which in boiling water is over 150g/liter. The dyeing on wool or silk can take place from a neutral bath in manner analogous to that described in Example 1 b. The dyeings possess similarly good fastnesses.

EXAMPLE 2

6g of the compound

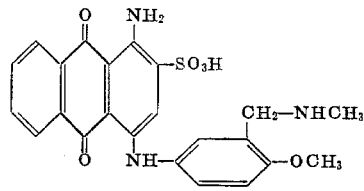

(obtained from 1-amino-4-bromoanthraquinone-2-sulphonic acid and 2-methoxy-5-aminobenzyl-N-methylamine) are acylated with p-toluenesulphochloride in the manner described in Example 1 a. A blue dyestuff is obtained, also with very valuable dyeing properties, which dyes on to wool and synthetic peptide fiber materials in fast, brilliant, greenish-blue shades.

EXAMPLE 3

Thirty parts 4-bromo-1-aminoanthraquinone-2-sulphonic acid (Na salt) are heated under reflux in 500 parts water with 40 parts 4-aminobenzyl-N-methyl-p-toluenesulphamide, 1 part cuprous chloride, 6 parts sodium bicarbonate and 50 parts ethanol. After reaction of the bromoamino acid the dyestuff which is formed is filtered off with suction at about 70° C., washed at 70° C. with 2 percent sodium chloride solution containing a small amount of acetic acid, and dried. The blue dyestuff which is obtained in good yield is identical with the dyestuff obtained according to Example 1 a. The parts mentioned in this Example are parts by weight.

EXAMPLE 4

One hundred g natural silk yarn are dyed, beginning at 40° C., in a liquor consisting of 5 liters water, 10g sodium sulphate (cryst.), 0.5g Marseilles soap and 1 g of the dyestuff of the constitution

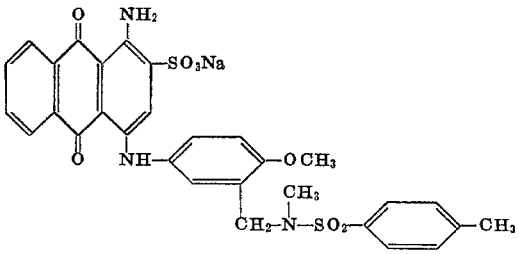

The bath is heated to 90° to 95° C. within 30 minutes and a finish is made after 1 hour.

The dyeing which is obtained has a very fast, brilliant, greenish-blue shade.

EXAMPLE 5

One hundred g synthetic polyamide is dyed, beginning at 40° C, in a bath consisting of 5 liters water, 5g ammonium acetate and 1g of the dyestuff of the constitution

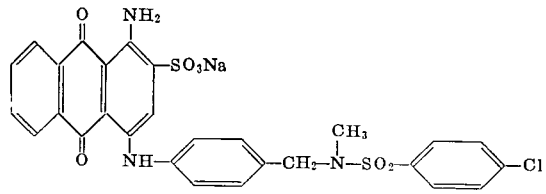

After 30 minutes boiling time, 1g acetic acid is added and dyeing is continued for a further 30 minutes.

The dyeing so formed is also a very fast, brilliant blue.

EXAMPLE 6

By dyeing in the manner described in Example 3 blue dyeings of good fastness were obtained on elastomere fibers on polyurethane basis.

I claim:

1. Anthraquinone dyestuff of the formula

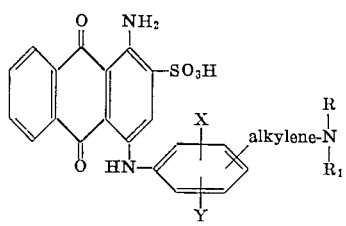

wherein X and Y stand for hydrogen, halogen, methyl, ethyl, methoxy or ethoxy; alkylene stands for methylene or ethylene; R stands for methyl; and $R_1$ stands for phenylsulfonyl or substituted phenylsulfonyl wherein the substituents on the phenyl radical are selected from the group consisting of methyl, ethyl, chloro, chloromethyl and β-chloroethyl.

2. Dyestuff of claim 1 having the formula

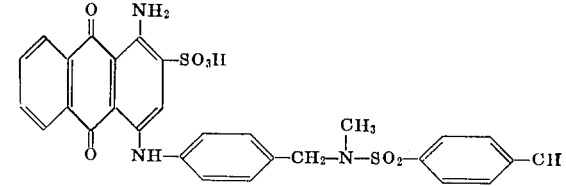

3. Dyestuff of claim 1 having the formula

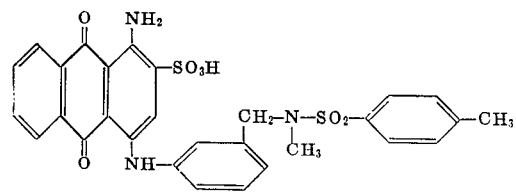

4. Dyestuff of claim 1 having the formula

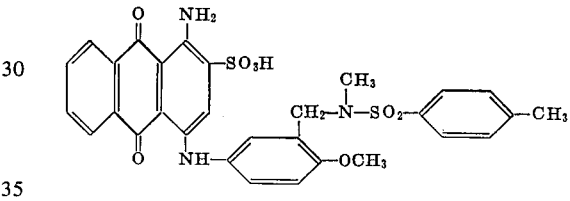

* * * * *